S. G. NOTTAGE.
SYSTEM OF STARTING PHASE CONVERTERS.
APPLICATION FILED JAN. 5, 1916.
1,298,774.
Patented Apr. 1, 1919.
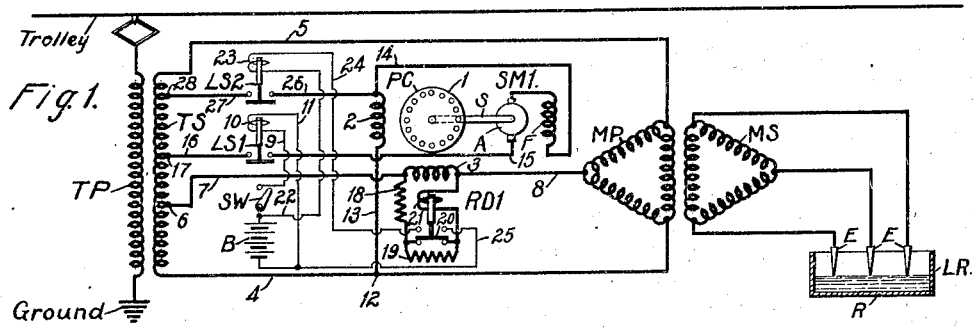
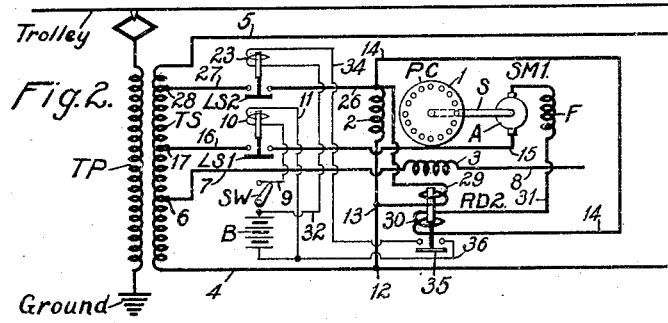
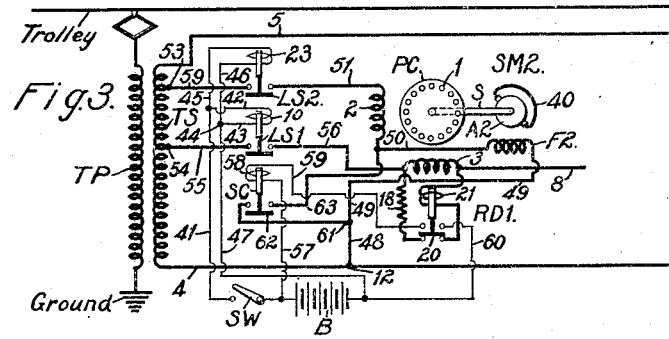
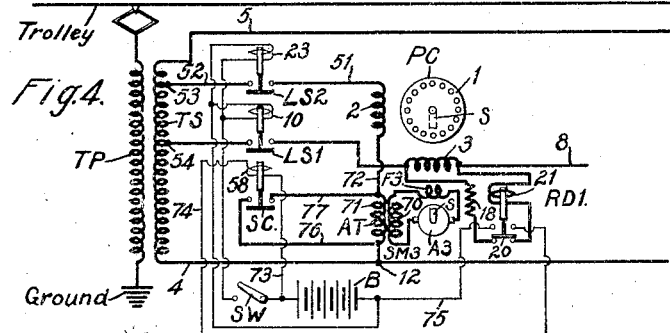
WITNESSES:
R. J. Fitzgerald
W. C. McCoy.
INVENTOR
Stanley G. Nottage.
BY
Wesley G. Carr
ATTORNEY

UNITED STATES PATENT OFFICE.

STANLEY G. NOTTAGE, OF WILKINSBURG, PENNSYLVANIA, ASSIGNOR TO WEST-INGHOUSE ELECTRIC AND MANUFACTURING COMPANY, A CORPORATION OF PENNSYLVANIA.

SYSTEM OF STARTING PHASE-CONVERTERS.

1,298,774.   Specification of Letters Patent.   Patented Apr. 1, 1919.

Application filed January 5, 1916. Serial No. 70,408.

*To all whom it may concern:*

Be it known that I, STANLEY G. NOTTAGE, a subject of the King of England, and a resident of Wilkinsburg, in the county of Allegheny and State of Pennsylvania, have invented a new and useful Improvement in Systems of Starting Phase-Converters, of which the following is a specification.

My invention relates to systems of starting phase-converters and especially to systems wherein phase-converting machines are interposed between a single-phase supply-circuit and a polyphase induction motor or set of motors for propelling an electric railway vehicle or the like.

One object of my invention is to provide a system of the above-indicated character which shall be relatively simple and inexpensive in construction and effective and reliable in operation, and which shall insure that the phase-converting machine is connected to the full voltage of the supply circuit or transformer winding only after the machine is running at synchronous speed.

Another object of my invention is to provide a relatively simple and reliable means for starting and accelerating a phase-converting machine of the class in question to synchronous speed in continuous correct phase relation to the supply circuit.

As is well known, the effect of connecting a phase-converting machine of the type under consideration to the full voltage of the supply circuit or to a transformer winding that is associated therewith, is to cause relatively heavy surges of current which, in addition to overheating or other injury of a like nature, also produces a relatively high torque which is liable to damage the rotating parts of the machine.

According to my present invention, I provide a starting motor for the phase-converting machine that has an operating winding connected in series relation with the primary phase winding of the phase-converting machine, whereby the machine is started and is accelerated to synchronous speed in continuous correct phase relation with the supply circuit; that is, with the back electromotive force thereof such as to hold the current therethrough at a minimum value, and I also provide automatic means for preventing the impression of full voltage upon the phase-converting machine until synchronous speed has been substantially attained. Consequently, the above-mentioned difficulties are entirely avoided by the use of my control system, as hereinafter more fully set forth.

In the accompanying drawing, Figure 1 is a diagrammatic view of the main and auxiliary controlling circuits of a complete system of control and phase conversion, as arranged in accordance with my invention; and Fig. 2, Fig. 3 and Fig. 4 are similar views of modifications of my invention.

Referring to Fig. 1 of the drawing, the system shown comprises a plurality of single-phase supply-circuit conductors trolley and ground, respectively; a main transformer having a primary winding TP that is directly connected between the supply-circuit conductors, and a secondary winding TS; a driving polyphase induction motor having a delta-connected primary MP and a similarly-connected secondary winding MS; a variable resistor, such as a liquid rheostat LR, that is associated with the secondary motor winding in accordance with a familiar practice; a phase-converting machine PC that is interposed between the single-phase supply circuit and the polyphase induction motor in a manner to be described; a starting motor SM1 for the phase converting machine PC; a plurality of main-circuit switches LS1 and LS2; a battery B or other suitable source of energy for energizing the actuating coils of the switches under predetermined conditions; and a relay device RD1 that is associated with the phase-converting machine PC for a purpose to be set forth.

The phase-converting machine PC comprises a rotor 1 of the well-known squirrel-cage type, a primary phase winding 2 and a secondary quadrature-related phase winding 3. One terminal of the secondary main transformer winding TS is connected through conductor 4 to one terminal of the delta-connected primary induction motor winding MP: the other terminal of the secondary transformer winding is connected to a second terminal of the primary motor winding through conductor 5; and an intermediate point 6 of the secondary transformer winding is connected through conductor 7, the secondary phase winding 3 of the phase-converting machine and conductor 8 to the remaining terminal of the primary motor winding.

It will be understood that the particular type of driving induction motor is not material to my present invention, and any well known type may be employed.

The variable resistor LR that is associated with the secondary induction motor winding MS may be of any well-known type and is here shown as comprising an electrolyte-containing tank or reservoir R and a plurality of immersible electrodes or plates E that are respectively connected to the terminals of the delta-connected secondary motor winding MS. It will be understood that, during the acceleration of the propelling induction motor, the liquid rheostat LR is suitably manipulated to gradually decrease the effective resistance thereof in any suitable manner, as is customary practice.

The starting motor SM1 is here shown as comprising a series-connected armature A and field-magnet winding F, although other types of starting motors may be employed, as described in connection with Fig. 3, for example. The armature A may be mechanically associated with the rotor 1 of the phase-converting machine PC in any suitable manner, as by a shaft s.

Assuming that it is desired to effect operation of the phase-converting machine PC in conjunction with the operation of the driving induction motor, a battery switch SW or any other suitable controlling device may be closed, whereupon a circuit is established from one terminal of the battery B through the switch SW, conductor 9, the actuating coil of the switch LS1 and conductor 11 to the opposite terminal of the battery B.

A main circuit at this time is completed from a point 12 of the conductor 4 through conductor 13, the primary phase winding 2 of the phase-converting machine, conductor 14, the field-magnet winding F and the armature A of the starting motor SM1, conductor 15, the switch LS1 in its closed position and conductor 16 to an intermediate point 17 of the secondary transformer winding TS. The primary phase winding 2 is thus connected in series relation with the starting motor SM1 across a predetermined portion of the transformer winding TS, and the machine is smoothly started and accelerated in continuous correct phase relation with the supply circuit.

It is a well-known fact that, in phase-converting machines of the type illustrated, the secondary phase winding voltage is not established until the rotor has substantially attained synchronous speed. I employ this fact to advantage by connecting across the secondary phase winding 3, a circuit comprising a suitable resistor 18, a second resistor 19 that is normally adapted to be short-circuited by the bridging contact member 20 of the relay device RD1 in its lower or inoperative position, and the actuating coil 21 of the relay device. The relay device is not actuated to its upper or operative position until substantially full-voltage conditions obtain in the secondary phase winding 3, or, in other words, until the phase-converting machine has substantially attained synchronous speed. The resistor 18 may be omitted provided the resistance of the actuating coil 21 of the relay device is of the proper value for effecting the action of the relay device at the proper instant.

Assuming that the phase-converting machine has substantially attained synchronous speed and that, therefore, full-voltage conditions obtain in the secondary phase winding 3, the relay device RD1 is then actuated to its upper position, whereupon a circuit is established from one terminal of the battery B through conductor 22, actuating coil 23 of the switch LS2, conductor 24, the bridging contact member 20 of the relay device RD1, in its upper position, and conductor 25 to the opposite terminal of the battery B. A main circuit is thereby established from the conductor 14 through conductor 26, the switch LS2, in its closed position, and conductor 27 to a point 28 that is located near one end of the secondary transformer winding TS. Consequently, after the phase-converting machine has attained synchronous speed, the primary phase winding 2 is connected across substantially the entire secondary winding. In this way, the hereinbefore-mentioned undesirable current surges are effectively obviated.

It will be observed that, when the relay device RD1 lifts, the resistor 19 is inserted in circuit with the actuating coil 21, thereby preventing damage to the coil when a materially higher voltage is impressed upon the primary phase winding 2 by the closure of switch LS2, and, consequently, a correspondingly higher voltage is induced in the secondary phase winding 3, to which the actuating coil 21 is connected.

It will thus be observed that the starting motor is connected in series relation with the primary phase winding 2 of the phase-converting machine under starting conditions across approximately one-half of the secondary transformer winding TS. The starting motor windings are, of course, designed to consume the proper value of voltage during the acceleration of the phase-converting machine, so that a smooth and even acceleration of the phase-converting machine is secured. When synchronous speed has been substantially attained, the primary phase winding 2 is connected across substantially the entire secondary transformer winding TS but no heavy surge of current occurs because the excitation of the primary phase winding 2 already has the correct phase relation and no mechanical shock is caused by the closure of the switch LS2. The switch LS1 should then be opened, by opening the switch SW, to exclude the starting motor from circuit. Moreover, the starting motor, when connected in accordance with my invention, may be of relatively small capacity, as compared with the starting motors of prior art systems, by reason of the fact that a material portion of the required accelerating torque is supplied by the phase-converting machine itself after a certain value of speed has been reached.

No exposition of the method whereby the phase-converting machine PC, in conjunction with the transformer winding TS, effects the conversion of energy from single-phase to three-phase for propelling the induction motor, is believed necessary, inasmuch as the particular system of connections therein involved forms no part of my present invention, except in so far as it performs necessary functions in the operation thereof.

Reference may now be had to the system of Fig. 2, which comprises the supply-circuit conductors, the main transformer windings, the phase-converting machine PC and its starting motor SM1, the switches LS1 and LS2 and the battery B, as already described in connection with Fig. 1 and, in addition, an initially open relay device RD2 that is associated with the phase-converting machine in a manner to be described. The relay device RD2 is provided with a shunt actuating coil 29 that is connected across the primary phase winding 2 and a differentially-connected series actuating coil 30 that is connected in series relation with the phase winding 2. Under starting conditions, the series coil 30 predominates and holds the relay device open. Under synchronous speed conditions, the shunt coil 29 is the stronger and closes the relay device, as set forth later.

To effect operation of the phase-converting machine, the switch SW may be closed, whereby the switch LS1 is closed in the manner hereinbefore described and a circuit is thereupon completed from the point 12 of the conductor 4 through conductor 13, the primary phase winding 2, conductor 14, series actuating coil 30 of the relay device RD2, in its open position, conductor 31, field-magnet winding F and armature A of the starting motor SM1, conductor 15, switch LS1, in its closed position, and conductor 16 to the intermediate point 17 of the secondary transformer winding TS. The series coil 30 of the relay device RD2 is thus energized in accordance with the current traversing the primary phase winding 2 and the starting motor SM1, and, the device is maintained in its lower or open position until synchronous speed of the phase-converting machine has been substantially attained and the current in the primary phase winding circuit drops to a predetermined value, which will approximately equal one-quarter of the accelerating value in some instances.

When the relay device RD2 has been raised to its upper or closed position by the action of the now predominating shunt coil 29, a circuit is established from one terminal of the battery B through conductor 32 and the actuating coil 23 of the switch LS2, conductor 34, bridging contact member 35 of the relay device RD2 in the upper position and conductor 36 to the opposite battery terminal. The switch LS2 is thereby closed to connect the primary phase winding 2 across substantially the entire secondary winding TS, as previously described.

In the system just set forth, the connection of the primary phase winding to the full transformer-winding voltage, although not directly dependent upon the electrical condition of the secondary phase winding 3, is, nevertheless, dependent upon the attainment of synchronous-speed conditions by the phase-converting machine.

Referring now to Fig. 3, the system illustrated comprises the supply-circuit conductors, the main transformer windings, the phase-converting machine PC, the switches LS1 and LS2, the battery B and the relay device RD1, as described in connection with Fig. 1, and, in addition, a different type of starting motor SM2 and a switch SC for a purpose to be described.

In both Fig. 3 and Fig. 4, the auxiliary resistor 19 is omitted as unnecessary, since the primary phase winding circuit is initially connected across substantially the entire secondary transformer winding TS, and the actuating coil 21 of the relay device RD1 may be designed to operate under the relatively steady voltage conditions, without requiring the use of the resistor 19.

The starting motor SM2 is of the repulsion type, comprising an armature A2, the commutator brushes of which are short-circuited by conductor 40, and a field-magnet winding F2 which is adapted to effect operation of the short-circuited armature A2 by reason of the well-known transformer action, that occurs in repulsion motors.

For effecting operation of the phase converting machine PC, the switch SW may be closed, whereby a circuit is established from one terminal of the battery B through switch SW and conductor 41, where the circuit divides, one branch including conductor 42, the actuating coil 10 of the switch LS1, and conductor 43 to a junction-point 44, and the other branch including conductor 45, the actuating coil 23 of the switch LS2 and conductor 46 to the junction-point 44, whence circuit is completed through conductor 47 to the opposite terminal of the battery B.

A main circuit is thereby established from the point 12 of the conductor 4 through conductors 48 and 49, the operating or field-magnet winding F2 of the starting motor SM2, conductor 50, the primary phase winding 2, conductor 51, the switch LS2, in its closed position, and conductor 52 to a point 53 of the secondary transformer winding TS that is located near one end thereof.

The closure of the switch LS1 completes a circuit from an intermediate point 54 of the secondary transformer winding TS, through conductor 55, the closed switch LS1, and conductor 56 to the secondary phase winding 3.

The primary phase winding 2 and the operating winding F2 of the starting motor are thus connected in series-circuit relation across substantially the entire secondary transformer windings TS. The starting motor is, of course, designed in conjunction with the phase-converting winding 2 to have sufficient impedance to limit the starting current to a safe value.

The phase-converting machine is thus started and accelerated to synchronous speed again in continuous correct phase relation with the supply circuit, and, after synchronous speed has been attained and full voltage relations occur in the secondary phase winding 3, the relay device RD1 is actuated to its upper or operative position as hereinbefore set forth, to complete a circuit that comprises one terminal of the battery B, conductor 57, actuating coil 58 of the switch SC, conductor 59, the bridging contact member 20 of the relay device RD1, in its upper position, and conductor 60 to the other terminal of the battery B.

The closure of the switch SC completes a main circuit from conductor 48 through conductor 61, bridging contact member 62 of the switch SC and conductor 63 to conductor 50, thereby short-circuiting the operating winding F2 of the starting motor SM2 and rendering the starting motor inoperative.

Such short-circuit may be effected without causing any objectionable current surges or mechanical shocks, since the excitation of the primary phase winding 2 occupies the correct phase position and is already of approximately the desired strength.

In some cases, a starting motor in a system of the type under consideration has to be designed to operate from an electro-motive force of 700 or 800 volts and, consequently, a repulsion motor, under such conditions, is very advantageous, since the voltage impressed upon the commutator is conductively independent of the supply-circuit.

In Fig. 4, the system shown comprises the supply-circuit conductor, the main transformer windings, the phase-converting machine PC, the switches LS1, LS2 and SC, the battery B and the relay device RD1, as previously set forth, and, in addition, a starting motor SM3 that is associated with an auxiliary transformer AT and the primary phase winding 2 of the phase-converting machine in a manner to be described.

The starting motor SM3 is of the series commutator type that comprises an armature A3 and a field-magnet winding F3, and is connected in a closed local circuit with the secondary winding 70 of the auxiliary transformer AT, the primary winding 71 of which is connected in series-circuit relation with the primary phase winding 2, in accordance with the circuit about to be traced.

To effect operation of the phase-converting machine, the switch SW may be closed, whereupon the switches LS1 and LS2 are actuated to their closed positions, as already described in connection with Fig. 3, and a main circuit is thus established from the point 12 of the conductor 4 through the primary winding 71 of the auxiliary transformer AT, conductor 72, the primary phase winding 2 of the phase-converting machine, conductor 51, switch LS2, in its closed position, and conductor 52 to the intermediate point 53 of the main transformer secondary winding TS. The closure of the switch LS1 completes the circuit of the secondary phase-winding 3, as hereinbefore set forth.

Although, in the system just described, the auxiliary transformer AT is employed, it will be appreciated that the starting motor SM3 is connected in effective series relation with the primary phase winding 2 of the phase-converting machine; that is to say, the current traversing the starting motor windings varies proportionally to the current in the primary phase winding 2, and the phase relation of the two currents with respect to the supply-circuit voltage remain substantially constant throughout the accelerating period, whereby the phase-converting machine is brought up to synchronous speed in continuous correct phase relation with the supply-circuit.

After synchronous speed has been reached and full-voltage conditions obtain in the secondary phase winding 3 of the phase-converting machine, the relay device RD1 is actuated to its upper position in the manner previously described, and a circuit is thereby completed from one terminal of the battery B through conductor 73, the actuating coil 58 of the switch SC, conductor 74, bridging contact member 20 of the relay device RD1 and conductor 75 to the opposite terminal of the battery B. A main circuit is thereupon established from the point 12 of the conductor 4 through conductor 76, the switch SC, in its closed position, and the conductor 77 to conductor 72, thereby short-circuiting the primary winding 71 of the auxiliary series-transformer AT. The starting motor SM3 is thus rendered inoperative after synchronous-speed conditions in the phase-converting machine PC have been attained.

Although, for the sake of simplicity and clearness, the induction motor windings and the liquid rheostat LR have not been shown in Fig. 2, Fig. 3 and Fig. 4, it will be understood that an induction motor of the type illustrated in Fig. 1, or any other suitable type, is employed in connection with the systems in question.

I do not wish to be restricted to the specific circuit connections or location and arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with an alternating-current supply-circuit, and a transformer winding energized therefrom, of a phase-converting machine having primary and secondary phase windings, a starting motor for said machine having an operating winding connected in series relation with said primary phase winding across a predetermined portion of said transformer winding, and means dependent upon predetermined machine conditions for connecting said primary phase winding across a materially greater portion of said transformer winding.

2. In a system of control, the combination with an alternating-current supply-circuit and a transformer winding energized therefrom, of a phase-converting machine having primary and secondary phase windings, a starting motor for said machine having an operating winding connected in series relation with said primary phase winding across a predetermined portion of said transformer winding, and means dependent upon secondary phase winding conditions for connecting said primary phase winding across approximately the entire transformer winding.

3. In a system of control, the combination with an alternating-current supply circuit and a transformer winding energized therefrom, of a phase-converting machine having primary and secondary phase windings, a starting motor for said machine having an operating winding connected in series relation with said primary phase winding across a predetermined portion of said transformer winding, and means associated with said secondary phase winding for connecting the primary phase winding across approximately the entire transformer winding only after the phase-converting machine has substantially attained synchronous speed.

4. In a system of control, the combination with a single-phase supply circuit and a transformer winding energized therefrom, of a phase-converting machine connected to said supply circuit, said machine having primary and secondary phase windings, a starting motor for said machine having an armature and a field-magnet winding initially connected in series-circuit relation with said primary phase winding across a predetermined portion of said transformer winding, and relay means connected across said secondary phase winding for connecting the primary phase winding across approximately the entire transformer winding when the phase-converting machine has substantially attained synchronous speed.

In testimony whereof I have hereunto subscribed my name this 31st day of Dec., 1915.

STANLEY G. NOTTAGE.

Copies of this patent may be obtained for five cents each, by addressing the "Commissioner of Patents, Washington, D. C."